US009801402B2

(12) United States Patent
Genera et al.

(10) Patent No.: US 9,801,402 B2
(45) Date of Patent: Oct. 31, 2017

(54) PROCESS FOR OBTAINING A HIGH PERFORMANCE INTEGRAL NIXTAMAL PRODUCT

(71) Applicants: Roberto Leopoldo Castro Genera, Irapuato Guanajuato (MX); Alicia Olga Lobo Iruegas, Irapuato Guanajuato (MX)

(72) Inventors: Roberto Leopoldo Castro Genera, Irapuato Guanajuato (MX); Alicia Olga Lobo Iruegas, Irapuato Guanajuato (MX)

(*) Notice: Subject to any disclaimer, the term of this patent is extended or adjusted under 35 U.S.C. 154(b) by 0 days.

(21) Appl. No.: 14/731,758

(22) Filed: Jun. 5, 2015

(65) Prior Publication Data
US 2015/0264962 A1    Sep. 24, 2015

Related U.S. Application Data

(62) Division of application No. 13/780,133, filed on Feb. 28, 2013, now Pat. No. 9,060,638.

(30) Foreign Application Priority Data

Mar. 14, 2012   (MX) .................. MX/A/2012/003179

(51) Int. Cl.
*A21D 2/00*     (2006.01)
*A23L 1/10*     (2006.01)
*A47J 27/00*    (2006.01)
*A23L 7/10*     (2016.01)

(52) U.S. Cl.
CPC ............. *A23L 1/1025* (2013.01); *A23L 7/197* (2016.08); *A23L 7/198* (2016.08); *A23L 7/1975* (2016.08); *A47J 27/002* (2013.01); *A23V 2002/00* (2013.01)

(58) Field of Classification Search
CPC .... A23L 1/1025; A23L 1/1033; A23L 1/1041; A23V 2002/00; A47J 27/002
See application file for complete search history.

(56) References Cited

U.S. PATENT DOCUMENTS

| | | | |
|---|---|---|---|
| 4,689,409 A * | 8/1987 | Reeve ................... | C08B 30/046 426/436 |
| 5,385,083 A * | 1/1995 | Toyokura .................. | B02C 9/04 241/101.5 |
| 5,558,886 A * | 9/1996 | Martinez-Bustos .. | A23L 1/0076 264/211.21 |
| 2009/0142461 A1* | 6/2009 | Meouchi Saade .... | A23L 1/1033 426/507 |

OTHER PUBLICATIONS

EP 0883999.*

* cited by examiner

Primary Examiner — Michele L Jacobson
Assistant Examiner — Preston Smith
(74) Attorney, Agent, or Firm — Hudak, Shunk & Farine Co., LPA

(57) ABSTRACT

A process used for the depth thermal treatment in maize for producing High Performance Integral Nixtamal, a process for treating maize under conditions different from known ones and by which a new product can be manufactured which has been called High Performance Integral Nixtamal.

6 Claims, 3 Drawing Sheets

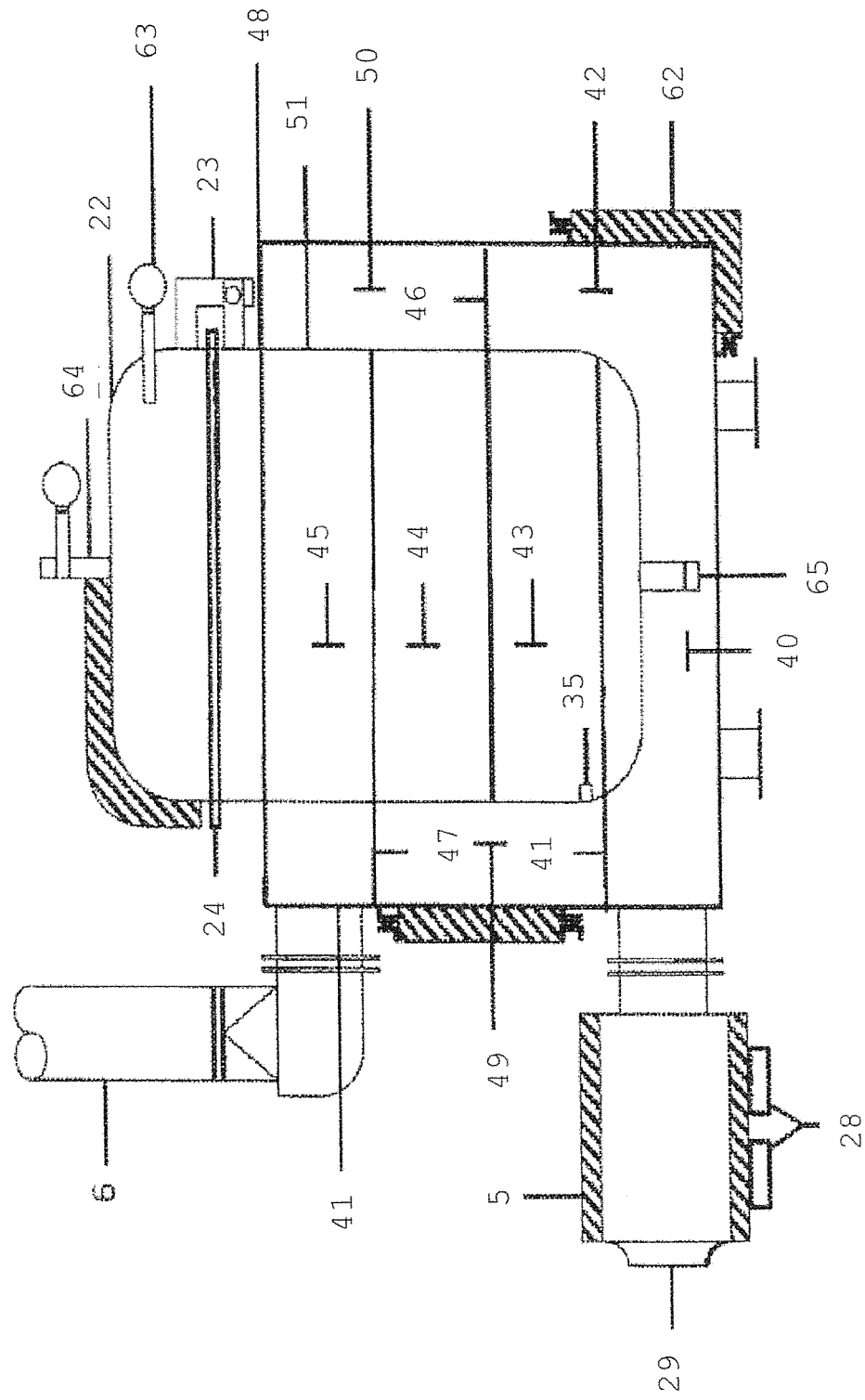

PROCESS FOR OBTAINING A HIGH PERFORMANCE INTEGRAL NIXTAMAL PRODUCT

FIELD OF THE INVENTION

Providing a different technology to cook maize, and other grains, cereals or legumes in a depth way by increasing internal temperature and humidity, in order to obtain a controlled and homogeneous transformation of their components reducing the loss of pericarp, the loss in the process, gas emissions and contaminated wastewater.

BACKGROUND OF THE INVENTION

The technologies of the state of the art used in the tortilla outlets for the production of nixtamal involves steps as pouring maize, without prior washing, into an open container and in which an amount in excess of lime and water is added; in the bottom of the tank is placed a burner, generally butane-based burner, that is maintained in ignition until the process water reaches a temperature that can be in the range of 88° C. and 96° C. depending on the height above sea level, and the necessary time may be in the range of 60 and 90 minutes, depending on the amount of maize and the capacity and efficiency of the burner. Subsequently, the maize is maintained in the process cooking water for a period of 10 to 12 hours. After the time elapsed, the maize is washed and grinded.

The Nixtamal that is produced in this way loses mostly maize pericarp, wherein said component is composed mainly of insoluble vegetable fiber, vitamins, minerals and antioxidants naturally found therein, as the dilution by excess lime causes that the vegetable fiber, vitamins, minerals and antioxidants are thrown away with the wastewater to the drainage. The tortilla/maize rate that is obtained with this nixtamal quality ranges between 130 and 150 kilograms of tortilla per 100 kilograms of maize, i.e. 1.3 to 1.5:1.

The traditional tortilla outlets which mostly is a low-scale business (family owned) about 90% of said tortilla outlets is operating within a production capacity range of 300 to 800 kg (kilograms) of tortilla per day. In order to obtain said production capacity is necessary to produce 350 to 900 kilograms of nixtamal per day. In this kind of business, and in other similar businesses, using nixtamal flour as raw material is based almost the entire supply of tortillas in Mexico.

The economic and product quality results of the tortilla depend significantly of the nixtamal characteristics outlets; however, so far it has not been seriously considered procedures for improve the cooking of maize and equipment for achieve said improvement, in order to improve the profitability and the obtained product as well as being compact, simple to install, with a easily operation and early return of the investment.

The way as currently is produced Nixtamal is susceptible to be widely improved. In view of that, has been designed a new especial apparatus, thereby may be operated under controlled and different process conditions, producing a better nixtamal, namely High Performance Integral Nixtamal.

From total of the tortilla outlets operating in Mexico, approximately 60% of said outlets uses maize as raw material to produce nixtamal which when milled it produces the necessary pulp to the production of tortilla. The remaining 40% uses nixtamalized maize flour, wherein said flour is made in large industrial facilities and which, when mixed with water, it produces a pulp which is used to produce tortilla.

The tortilla/maize ratio that is achieved with traditional system depends on the control degree on the operation thereof and said ratio is within of a range of 130 to 150 kg tortilla per 100 kg maize. The ones that use nixtamalized maize flour achieve a ratio within a range of 175 to 185 kilograms tortilla per 100 kilograms flour.

When a tortilla outlet operates with High Performance Integral Nixtamal produced by the process and special equipment describe and claimed herein, it is obtained a tortilla/maize ratio, using maize as raw material, of 170 to 180 kilograms tortilla per 100 kilograms maize.

This new technology applied to maize and other grains satisfactorily solves the current and background problems in tortilla outlets there in Mexico and using maize as raw material. This new technology provides improvements such as:

- the time required for cooking maize and obtaining Nixtamal is significantly reduced;
- to prevent the losing of an important part of the grain, namely vegetable fiber, vitamins, minerals and antioxidants, wherein said losing affects the production cost and decrease the nutritional properties of the tortilla;
- the flow of contaminated wastewater is significantly reducing;
- increasing the tortilla/maize ratio, performance, profiting production productivity and cost, when being able to obtain the same amount of tortilla with less maize;
- decreasing the production cost by reducing consumption of fuel required for cooking;
- to help improve the ecological environment by reducing $CO_2$ emissions to atmosphere and wastewater flows to the drains.

The process further provides other important advantages like: obtaining a saving within a range of 40% to 50% in the fuel consumption necessary for cooking the maize. This advantage is benefic for the business economics, making them more profitable.

A significant positive result that is obtainable from the reduction in fuel consumption is the decreasing, in the same proportion, of the flue gas emissions, mainly $CO_2$. The gases produced from combustion cause greenhouse effect and consequently changing the weather.

Another important advantage is that tortilla obtained from the High Performance Integral Nixtamal which is obtained by this system and process shows better nutritional properties, so as it practically preserves all components contained in the pericarp, namely: dietary or insoluble vegetal fiber, vitamins, minerals and antioxidants. These components are lost in large amounts in the traditional process since they are diluted with cooking water and discarded. Furthermore, this system provides a tortilla with better properties for digestion and assimilation by its fiber additional content and higher gelatinization of the maize starch. These advantages have been obtained by the depth cooking process at a higher pressure and temperature than the traditional process.

It is an advantage of the invention to increase up to two and a half times the content of dietary or vegetal fiber, since the gastrointestinal system cannot digest nor assimilate said vegetal fiber helping to achieve a sense of satiety with lower intake of food, decreasing appetite.

These advantages will provide said benefits for millions of consumers because the tortilla is a basic issue of the daily diet in Mexico.

It is reported annual consumptions per capita on the order of 120 kg in national censuses. This represents an average of 328 grams per day per subject, which is equivalent to about 12 tortillas.

The results discussed here were obtained from real and scaled testing in a typical tortilla outlet. The system has been designed and manufactured for cooking maize and consequently for the production of High Performance Integral Nixtamal. In addition, a commercial stone mill apparatus was installed for milling Nixtamal and producing pulp and subsequently said pulp was introduced to a commercial tortilla machine in order to produce tortillas. In this manner a pilot facility is capable of producing the new High Performance Integrated Nixtamal and pulp producing 3000 tortillas per hour, of a quality higher than the tortilla produced by traditional processes. This pilot facility has been operated daily for several weeks with the results here presented, during this period it has been sold the tortilla produced with the purpose of verifying the acceptance from public.

BRIEF DESCRIPTION OF THE DRAWINGS

FIG. 3 shows a detailed reactor design.

DETAILED DESCRIPTION OF THE INVENTION

The distinctive details of this novel system to processing maize and other grains, as cereals or legumes, will be given clearly in the following description. The production system comprising equipment which are necessary to provide the needed conditions for the process. The system comprises a process basket wherein the maize is deposited to be thermally treated, an electric-controlled winch to move or lift the process basket and insert said process basket in a washing tank, in which water and agitation of same are used to removed insecticide residues, dust and foreign material; a rotating structure where is installed electric-controlled winch. Said rotating structure helps to move process basket from the wash tank to the cooking tank reactor, wherein the thermal and pressure conditions required by the process are generated and wherein is achieved the transformation of maize in a High Performance Integrated Nixtamal.

Figure 1:
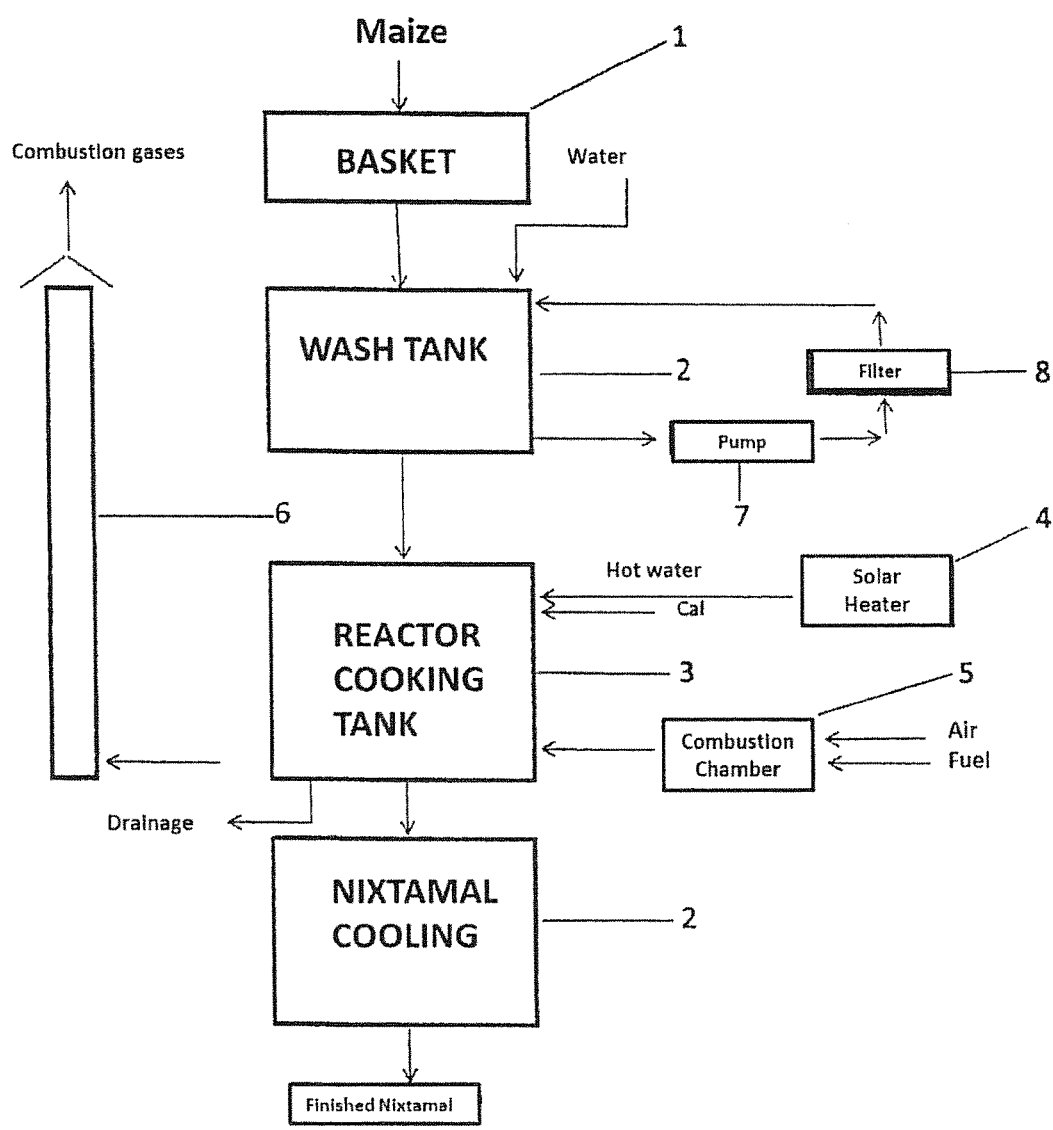
FIG. 1 is a flow diagram of the process.

FIG. 1 shows a flow diagram of the required process for depth cooking of maize and obtaining of a High Performance Integrated Nixtamal and the specially designed equipment for this purpose. The process begins by introducing the process basket (1) with maize, in the washing tank (2). The washing tank is supplied with water at room temperature, subsequently the contain of the washing tank (maize and water) is stirred to remove dust, insecticide residues used in grain storage and separation by floating foreign matter other than maize. Simultaneously, the washing water of the maize is recirculated by a pump (7) that delivery dirty water to a filter (8) which removes impurities and returns the clean water to the washing tank. The previous washing procedure for maize, in despite of being very important it is something that is rarely made in the traditional process.

Once the maize is clean the process basket is removed of the washing tank (2) by the rotating structure and the electrical-controlled winch, and then the process basket (1) is inserting to the cooking tank reactor (3). Hot water is added at 60 degrees Celsius from the solar heater (4) and hydrated lime at a ratio which can vary according to the maize type, from 1 to 3 parts of hydrated lime for 1,000 parts of maize. The water, hydrated lime and maize are stirred to homogenize. The combustion chamber (5) when is ignited discharges combustion gases firstly to the reactor (3) and then to the atmosphere through a chimney (6). Once the combustion chamber (5) is ignited, the temperature inside reactor (3) is increased. Depending on the maize variety and age, the temperature rises to reach 90 to 100 degrees Celsius. When said temperature is reached (from 12 to 15 minutes), the combustion chamber (5) is turned off, and then the tank reactor is maintained in a first standby period from 20 to 30 minutes, in order to homogenize the internal humidity of the grain. Along said standby time the temperature in the reactor (3) is maintained at same temperature. When the first standby time has elapsed, the combustion chamber (5) is re-ignited and temperature is raised inside the reactor (3) to 115° C. and 120° C. and the pressure inside the reactor (3) reaches from 1 to 1.3 kg/cm$^2$. At this temperature and pressure, it is achieved a cooking with a depth or higher penetration in the grain without losing the pericarp. When said temperature and pressure is reached, the combustion in the chamber (5) is turned off again and the cooking tank reactor is maintained in a second standby period at constant temperature by a time from 5 to 10 minutes. When the second standby period is elapsed the pressure inside reactor (3) is reduced up to atmospheric pressure. After the pressure inside the reactor (3) the lid of the reactor (3) is opened and the process basket (1) is removed from the cooking tank reactor using the electric-controlled winch and the rotary structure and positioned inside the washing tank (2) for cooling with water from a water purifying equipment. The water from the water purifying equipment is passed through a UV lamps and ozonized by ozone injection for purifying, in order to decreasing the bacterial content. In this way a nixtamalized product is obtained from maize with a longer duration, without adding preservative additives. Once temperature of the nixtamal is from 25 to 35 degrees Celsius the process basket (1) and nixtamal is transferred to a mill. At this point the process ends for the production of High Performance Integral Nixtamal.

Figure 2:
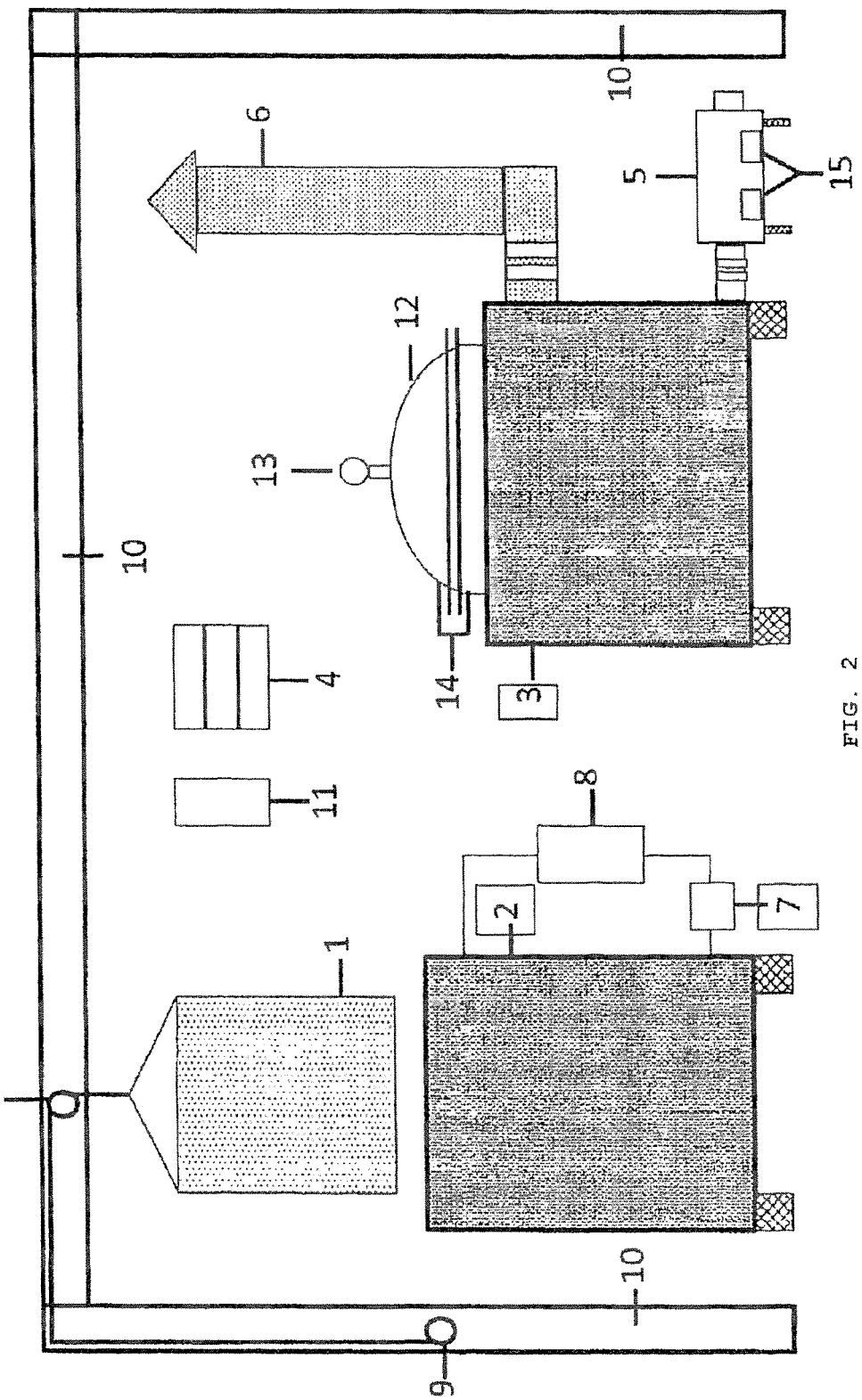
FIG. 2 shows a general arrangement of equipment.

FIG. 2 shows the equipment for carrying the process and not shown in the flow diagram of FIG. 1:
  process basket (1) wherein maize is loaded;
  washing tank (2) wherein the basket (1) is initially introduced;
  electric-controlled winch (9) and rotating structure (10) for transferring the process basket (1) to the reactor (3);
  reactor lid (12) which opens to admit process basket (1) within cooking tank reactor (3);
  a hinge and clamping system (14) for the reactor lid (12);
  the water solar heater (4) for supplying hot water to the reactor (3);
  gas burners (15) for providing required thermal energy;
  combustion chamber (5) for providing the required temperature to the gas burners (15) to ensure complete combustion of the gas;
  a chimney (6) for inducing a secondary air flow and combustion gases through chamber and outside of the reactor (3) and discharge into the atmosphere;
  security device (13) for avoiding overpressure and temperature measurements inside the reactor (3);
  bactericidal treatment equipment (11) for purifying water used at last stages of the process and for cooling Nixtamal contained in the process basket (1) wherein the water used returns to the washing tank (2) for cooling.

FIG. 3, drawing of the cooking tank reactor, which is specially designed to generating the specific conditions required for production process of the High Performance Integrated Nixtamal.

The FIG. 3 shows the most important parts of the cooking tank reactor (3) indicated as follow:

- inner tank (21). This part is a cylindrical metal container designed to operate at pressure and high temperature;
- Upper metal lid (22) which can be rotated and placed vertically by hinge support (23) for admitting the process basket containing the maize to be processed inside the cooking tank reactor.
- flanges (24) installed in the tank (21) and the upper metal lid (22) for clamping both sides and sealing the inner and preventing outflows of heat and steam during operation;
- internal support (35) welded to the tank (21) for sustaining the basket;
- metal chimney (6). This part causes a natural induction of an air flow through reactor and combustion chamber (5);
- combustion chamber (5), which is metal container that provides a high temperature inside atmosphere of about 800° C. ensuring that the fuel is fed to the burners (28) without losses into the atmosphere. Chamber (5) is thermally insulated for preventing heat losses and having a device (29) for controlling a secondary air flow entering to the system. Hot air supplied by the chamber (5) is induced by chimney (6) within a high temperature chamber (40) located at the bottom of the reactor, said chamber is formed by a concentric metal ring (41) welded both the outer wall of the tank (21) and the inner wall and outer cylindrical concentric metal tank. The chamber (5) directs the ascending heated gas flow to the second chamber (43) through an annular space (42) between inner tank (21) and outer cylindrical concentric metal tank (42), wherein the annular space (42) is located and designed with an area for conducting gas flow and obtaining maximize heat transfer to the interior of pressured inner tank (21);
- the reactor comprises three serial additional chambers (43), (44) and (45) for heat transferring to the interior of tank (21) formed by directional concentric metal rings (46) (47) and (48) respectively, welded to the outer wall of the tank (21) and to the interior of the outer cylindrical concentric metal tank. Each of the chambers has an annular space (49), (50), and (51) respectively, spaces located between two tanks, so as to direct the ascending gas flow between a chamber and the next one, until the gas exits by the chimney (6);
- a outer tank is thermally insulated by 3 inch ceramic fiber (62) which is also protected by a stainless steel metal cover;
- a bimetallic thermometer (63) for facilitating control of process conditions, and a pressure gauge (64), both located in the lid (22).
- safety device for avoiding overpressure (65).

What is claimed is:

1. A process for producing High Performance Integral Nixtamal from maize, comprising:
    a) washing maize in the washing tank;
    b) introducing the maize obtained in (a) to a reactor tank,
    c) adding water at 60° C. and hydrated lime in a ratio of one to three parts per thousand of maize;
    d) increasing temperature, by a heat supply, to a temperature between 90° C. to 100° C. in the reactor tank; when temperature is reached the reactor tank and after a time from 15 to 20 minutes the adding of heat is suspended;
    e) maintaining the tank reactor for a standby time from 20 to 30 minutes after step d);
    f) increasing temperature, by a heat supply, to a temperature between 115° C. to 120° C. and a pressure from 1 to 1.3 kg/cm$^2$ in the reactor tank and then, suspending the adding of heat;
    g) maintaining the pressured tank reactor for a standby time from 5 to 10 minutes after step f);
    h) reducing the pressure into pressured reactor tank to atmospheric pressure.

2. The process of the claim 1, wherein the obtained product in step h) is removed from the reactor and washed.

3. The process of the claim 1, wherein the washing water is filtered and recirculated to the washing tank.

4. The process of the claim 1, wherein the mixture of water, lime and maize at step c) is stirred.

5. The process of the claim 2, wherein the product is washed with purified water.

6. The process of the claim 5, wherein the product is milled.

* * * * *